Fig. 1.

Patented Oct. 23, 1945

2,387,237

UNITED STATES PATENT OFFICE 2,387,237

CATALYTIC POLYMERS FROM HIGH BOILING UNSATURATED PRODUCTS OF PETROLEUM PYROLYSIS

Waldo C. Ault, Peoria, Ill., assignor to The United Gas Improvement Company, a corporation of Pennsylvania Application April 1, 1941, Serial No. 386,232

11 Claims. (Cl. 260—80)

The present invention relates to the catalytic polymerization of high boiling monomeric hydrocarbon material recovered from tar formed during the production of combustible gas by processes involving the pyrolytic decomposition of petroleum oil with or without the aid of catalysts and to catalytic polymers of said monomeric hydrocarbon material.

Various processes are known for the manufacture of combustible gas such as carburetted water gas and oil gas, wherein a petroleum oil such as crude oil or a fraction thereof, for example, gas oil or residuum oil, is pyrolytically decomposed.

In such processes petroleum oil is pyrolyzed in vapor phase and at reduced partial pressures due to the presence of diluent gas such as blue water gas and/or steam and at relatively high temperatures such as 1300° F. average set temperature and above as measured by standard type shielded thermocouples.

In such processes the gas leaving the gas-making apparatus is usually brought into contact with water such as in the wash box, and as a result the tar which separates from the gas is usually recovered in the form of an emulsion with water. Thus the tar emulsion in extreme cases may contain as high as 95% water or even higher. In some cases the tar emulsion may be in the form of a pasty solid of very high viscosity. Frequently, the tar emulsion will contain at least 50% water and in this respect differs from tars obtained in processes for the production of coal gas or coke oven gas, or in many oil cracking processes for the production of motor fuel, for in the latter processes the tar as recovered is not in an emulsion form.

The recovered mixture of tar and water from gas-making operations involving the decomposition of petroleum oil is usually first collected in a settling tank for the separation of as much water as possible by layer formation and decantation.

In accordance with conventional practice the relatively stable tar emulsion which remains after separation of the water layer is usually treated according to some method of dehydration such as centrifuging or distillation.

Centrifugal methods of treating tar emulsions, however, separate only the tar and the water of the emulsion and do not separate lighter tar constituents from the heavier. Furthermore, the presence of free carbon in the emulsion may give rise to operating difficulties.

The separation of the tar emulsion by distillation results in fractions which comprise (1) water, (2) a distillate from the tar comprising light oil and dead oil, and (3) residual tar.

For purposes of convenience in description, that portion of the distillate boiling up to approximately 210° C. (410° F.) at atmospheric pressure will be designated "light oil" and that portion of the distillate boiling above approximately 210° C. (410° F.) at atmospheric pressure will be designated "dead oil." These may be separated by distillation.

The "light oil" fraction contains, among other things, valuable saturated and unsaturated aromatic hydrocarbons such as benzene, toluene, xylene, styrene, methyl styrene, indene, etc.

The "dead oil" fraction contains naphthalene, methyl and other substituted naphthalenes, and may contain anthracene, methyl anthracene, as well as numerous other hydrocarbons for the most part as yet unidentified.

The residual tar still contains polymerizable constituents.

The residual tar has a number of uses. For example, it may be used as a road tar, or as a heavy liquid fuel. For both purposes the control of the viscosity of the residual tar is of importance because of its effect upon the ease of handling.

Due to the fact that the tar is subjected to elevated temperatures for considerable lengths of time in ordinary distillation procedures of the prior art for breaking the emulsion and for the separation of light oil and dead oil as distillate, substantial polymerization is caused to take place. Such polymerization tends to reduce the quantity of distillate on the one hand and to increase the viscosity of the residual tar on the other, both of which are undesirable.

In the copending applications Serial Number 342,735 filed June 27, 1940 by Edwin L. Hall and Howard R. Batchelder, which has matured into Patent 2,366,899, granted January 9, 1945 Serial Number 353,034 filed August 17, 1940 by Howard R. Batchelder, which has matured into Patent 2,383,362, granted Aug. 21, 1945, and Serial Number 370,608 filed December 18, 1940 by Edwin L. Hall and Howard R. Batchelder, there are described and claimed processes for the separation of such petroleum oil tar emulsions into the water, residual tar and hydrocarbon oil without polymerization or with greatly reduced polymerization of heat polymerizable unsaturates in the tar and with the recovery of greatly increased yields of hydrocarbon oil boiling within the range of from 210° C. to 350° C. and higher, said oil being substantially free of intensely colored pitch constituents which comprise residual tar and containing relatively large quantities of heat polymerizable monomeric unsaturated hydrocarbons of aromatic characteristics.

The said copending application 342,735 discloses the separation of petroleum oil tar emulsions and the separation of "dead oil" and "light oil" from the pitch constituents of residual tar by rapid distillation with the avoidance of polymerization of "dead oil" constituents.

The said copending application 353,034 discloses the separation of petroleum oil tar emulsions and the separation of "dead oil" and "light oil" from the pitch constituents of residual tar by the use of relatively low-boiling hydrocarbon solvents such as propane, butane, etc. with the avoidance of polymerization of "dead oil" constituents.

Copending application 370,608 discloses other methods for such separation such as fractional condensation.

Copending application 370,608 also describes and claims the heat polymerizable monomeric hydrocarbons produced by such separation processes and heat polymers produced therefrom.

I have found that new and valuable resins may be produced by catalytically polymerizing unsaturated hydrocarbons boiling within the range of from 210° C. to 350° C. and higher, said material boiling within said boiling range having been separated from petroleum oil tar by a process such as the processes described and claimed in the above copending applications in which excessive polymerization of heat polymerizable monomeric hydrocarbon material in said boiling range is avoided.

Thus, whereas in the conventional separation of dead oil from petroleum tar emulsion, namely by extended distillation lasting frequently up to 15 hours and more, very little if any heat polymerizable monomeric hydrocarbon material is taken off in the dead oil boiling range, in my starting materials such heat polymerizable monomers are present to at least 15% of the total unsaturation present in the dead oil and preferably to at least 25%.

As catalysts, I prefer to employ acid acting catalysts such as mineral acids, for example, sulfuric acid, hydrogen chloride, acids of phosphorus, or acid acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ethyl ether complex, boron trifluoride-phenyl methyl ether complex, boron trifluoride-dioxan complex, boron trifluoride-toluene complex, corresponding aluminum chloride complexes, etc.

Metallic halides and their complexes, which I may employ as catalyst, are characterized by their ability to hydrolyze in the presence of water to give an acid reaction and, hence, for convenience they may be termed acid acting metallic halides.

Though acid acting catalysts are preferred, other catalysts may be employed if desired such, for example, as catalysts of the neutral surface type. Examples of such catalysts are activated clays, silica gel, activated carbon, etc.

In carrying out my invention, I prefer to divide the hydrocarbon oil separated from residual tar into light oil boiling up to approximately 210° C. at atmospheric pressure and dead oil boiling above 210° C. at atmospheric pressure. This division may be made by distillation preferably under vacuum or in the presence of a diluent such as steam, to reduce the partial pressures of the constituents in order to avoid excessive heat polymerization during the separation of the material into light oil and dead oil.

I have discovered that by far the greater proportion of the total unsaturation contained in the dead oil so obtained may be catalytically polymerized to produce high yields of new and valuable resins.

I have further discovered that the total unsaturation is comprised of a considerable portion readily polymerized either by heat or by a catalyst and a considerable portion readily polymerized by a catalyst but not readily polylmerized by heat.

There appears to be a tendency for the material which is readily polymerized by heat to concentrate in the higher boiling portion of the dead oil, whereas the material readily polymerized only by a catalyst appears to have a tendency to concentrate in the lower boiling portion of the dead oil.

The foregoing features as well as other features of the invention will be more particularly described as the specification proceeds and in connection with the attached figures in which.

As an example of a convenient procedure for the production of my new polymer with the use of sulfuric acid as catalyst, the following is given.

*Example 1*

A sample of the oil to be polymerized, say 500 cc. is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C., control being obtained by raising or lowering an ice water bath. The addition of the acid is continued in this manner until no further temperature rise is noted. Usually the necessary amount of acid to achieve this end has been found to be about 1% by volume of the oil present.

The oil is then diluted with approximately an equal volume of naphtha, toluene, or similar diluent and the solution then decanted into 500 cc. of warm water (approximately 60° C.), leaving the acid sludge behind.

After settling the water layer is drawn off and neutralization of the acid is accomplished by use of a 10% to 20% NaOH solution. After the caustic washing an additional water wash may be made. Whether the additional water wash is employed or not the resin solution is dried by filtration through a bed of a drying agent such as lime.

If desired, the diluent may be added before polymerization instead of after polymerization.

After neutralization and drying the resin may be extracted, that is, removed, from the unpolymerized oil or the resin may be concentrated therein by vacuum distillation which may be assisted by steam. The melting point of the resin and the yield will depend, other things being equal, upon the degree of extraction of the resin from the unpolymerized oil.

An extraction procedure which has been found convenient particularly in the determination of resin yields is as follows:

*Example 2*

The material is transferred to a tared two-liter flask equipped with a ground glass neck. The material is carefully weighed at this point.

The flask is provided with means for measuring vapor temperatures and is connected with condensing apparatus and with means for providing a vacuum including a pressure control device.

(1) Bumping during distillation is avoided by folding iron wire several times to such length that one end reaches slightly into the neck of the flask while the other rests on the bottom of the flask.

(2) The pressure is reduced to 100 mm. Hg absolute and heat is applied by means of a bunsen burner.

The distillation is continued at 100 mm. Hg absolute pressure until the vapor temperature reaches 180° C. During the first stage of the distillation care should be exercised to prevent crystallization of naphthalene if present, as by operating the condenser at a temperature sufficiently high to avoid this.

(3) When the vapor temperature reaches 180° C. at 100 mm. Hg absolute, the flame is lowered and the pressure gradually reduced to 20 mm. absolute, using care to avoid carry-over. When a pressure of 20 mm. Hg is reached, the pressure is maintained at that value and the distillation continued until a vapor temperature of, for example 195° C., is reached.

During this second stage the condenser may be cooled by cold water taking care to avoid the solidification of anthracene, if present.

The distillation is conducted rapidly, 5 to 10 cc. of oil per minute being taken off.

When a vapor temperature of 195° C. is reached heating is discontinued and air is allowed to enter the apparatus slowly until atmospheric balance is restored.

The flask is then disconnected, the wire removed and the flask with the resin weighed.

The percent yield of resin is calculated as follows:

$$\frac{\text{Resin weight}}{\text{Original oil weight}} \times 100 = \% \text{ resin at the melting point of the resin as obtained.}$$

If higher melting point resins, such as resins having melting points of from 185° C. to 200° C. as determined by the cube in mercury method, are desired, the extraction may be conducted with the use of steam during the distillation. Lower melting point resins may be produced by terminating the distillation at lower temperatures.

Although various methods for determining melting points are available for convenience and reproducibility melting points as set forth in this specification are intended to mean melting points as determined by the cube in mercury method using apparatus described in A. S. T. M. Designation D 61-24 with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C.=Softening point ° C. $\times 1.25 + 2°$ C.

As before stated, lower or higher melting point resins may be obtained by varying the extraction of associated oil. Thus resins ranging from very soft to hard resins having high melting points may be readily obtained.

It has been found that as a general rule each 6% of oil left in the resin lowers the melting point about 10° C.

Resins having calculated 120° C. cube in mercury melting points have been readily produced in yields of from 26% to 37% of dead oil obtained in the process of copending application Serial Number 342,735, and resins of the same calculated melting point in yields as high as 53% have been obtained in the case of dead oil obtained in the process of copending application Serial Number 353,034.

Actual yields with melting points less than 120° C. may be readily converted to calculated yields at 120° C. melting point by subtracting from the actual yield in per cent a percentage of the actual yield in per cent equal to $$6 \times \frac{120° \text{ C.} - \text{actual melting point ° C.}}{10}$$

Conversely yields of resin with melting points greater than 120° C. may be converted to calculated yields at 120° C. melting point by adding to the actual yield in per cent a percentage of the actual yield in per cent equal to $$6 \times \frac{\text{Actual melting point ° C.} - 120° \text{ C.}}{10}$$

Unless otherwise stated, yields of resins given herein are yields converted to 120° C. melting point.

The color of the resins obtained hereunder vary from light yellow to dark brown depending upon the particular material polymerized and other conditions.

For convenience resins obtained in accordance with the present invention have been rated in color in accordance with the following color comparison method.

Color standards are kept in 7 oz. French square glass stoppered bottles and are sealed to prevent evaporation.

Three stock solutions are prepared.

A. 25 ml. of concentrated C. P. HCl diluted to 1 to 1.

B. 300 g. FeCl₃.6H₂O and 180 ml. of Solution A.

C. 60 g. of CoCl₂.6H₂O and 60 ml. of Solution A.

Solutions B and C are best prepared by grinding the salts in a mortar in the presence of dilute HCl and when completely dissolved filtering through a dry filter paper.

No more than 0.3% Ni should be present in the chemicals used.

The individual standards are made up as follows:

| No. | Solution A | Solution B | Solution C | Water |
|---|---|---|---|---|
|   | Ml. | Ml. | Ml. | Ml. |
| ½ | 250.0 | 0.9 | 0.7 |  |
| 1 | 250.0 | 2.0 | 1.5 |  |
| 1½ | 250.0 | 2.8 | 1.9 |  |
| 2 | 250.0 | 4.0 | 2.5 |  |
| 2½ | 250.0 | 5.6 | 3.2 |  |
| 3 | 250.0 | 8.0 | 4.0 |  |
| 3½ | 250.0 | 13.0 | 5.0 |  |
| 4 |  | 16.0 | 4.0 | 250.0 |
| 5 |  | 20.0 | 5.5 | 200.0 |
| 6 |  | 8.0 | 2.0 | 40.0 |
| 7 |  | 16.0 | 3.0 | 40.0 |
| 8 |  | 26.0 | 2.0 | 20.0 |
| 9 |  | 50.0 | 4.0 | 11.1 |
| 10 |  | 50.0 | 4.0 |  |

Fractional standards may be prepared as follows:

|  | No. |
|---|---|
| Pipette 50 ml. of No. ½ into a 100 ml. volumetric flask and dilute with Solution A to 100 ml. | ¼ |
| Repeat the above procedure except use 50 ml. of No. ¼ instead of 50 ml. of No. ½ | ⅛ |
| Repeat the above procedure except use 50 ml. of No. 1½ | ¾ |
| Repeat the above procedure except use 50 ml. of No. ¾ | ⅜ |

In the color determination of a resin, 2 grams of the resin are dissolved in 25 cc. or 21.7 grams of water white toluol. When solution is completed it is then transferred to a 7 oz. French square glass stoppered bottle of the same dimensions as the standard, and the color estimated by comparison with the standards.

In the event the color of the solution prepared in this manner is darker than color standard No. 10, 1 cc. of the resin solution is made up to 26 cc. with additional toluol. A suitable quantity may then be transferred to a French square glass stoppered bottle and the color estimated by comparison with the standards. Due to the fact that the resin solution has been diluted with additional toluol 10 will be added to the observed color reading in this case. If this second sample is still darker than No. 10 standard another dilution is performed in exactly the same manner. In this latter case 20 will be added to the observed color reading.

Resins obtained hereunder have been produced with colors ranging from 5 and below to 19 and above according to the above described method of estimating color.

Resins obtained hereunder produced from dead oil obtained in accordance with copending application Serial Number 342,735 have shown a tendency to be somewhat lighter in color than those produced from dead oil obtained in accordance with copending application Serial Number 353,034. Also my resins when produced from the lower boiling portions of dead oil thus obtained have shown a tendency to be somewhat lighter in color than my resins when produced from the higher boiling portions.

Further, my catalytic resins, generally speaking, have shown a tendency to be somewhat lighter in color than heat polymer resins produced from the same oil although this is not always true.

Convenient procedures for the production of my new polymer with the use of metallic halide catalysts or metallic halide-organic solvent complex catalysts is as follows:

*Example 3*

10 grams of the selected catalyst is suspended in 300 cc. of benzene by stirring. 300 cc. of dead oil to be polymerized are added dropwise from a separatory funnel while maintaining the temperature of the reaction mass below 50° C. by raising or lowering an ice water bath as needed. When the addition is completed the mass is stirred for 2 hours and then neutralized with aqueous NaOH solution (10 to 20%). Stirring is continued for an additional hour. Clay or other filter aid is added and the mass is subjected to suction filtering. The aqueous layer is then separated and the treated material is washed with hot water until neutral to litmus. The treated material is then filtered through lime to remove H₂O, and the resin is then extracted from associated oil as previously described.

*Example 4*

10 grams of the selected catalyst is suspended by stirring in 200 cc. of dead oil to be polymerized. An additional 300 cc. of the dead oil is then added dropwise from a separatory funnel while maintaining the temperature of the reaction mass between 40° C. and 60° C. When the addition is completed the mass is stirred for 2 hours. 500 cc. of benzene is then added. The mass is then neutralized with aqueous NaOH (10 to 20%) while continuing the agitation for an additional hour. Clay or other filter aid is added and the mass subjected to suction filtering. The caustic aqueous layer is separated and the treated material is then washed with hot water until neutral to litmus. The treated material is then filtered through lime to dry and the resin is then extracted from the associated oil as previously described.

The following example shows results obtained on dead oil separated from distillate recovered from petroleum tar emulsion by flash distillation as described in copending application Serial Number 342,735. The polymerization procedure of Example 1 was employed.

*Example 5*

506.2 grams of dead oil in solution in toluene were treated with 5 cc. of 66° Bé. H₂SO₄. Approximately 37% of the dead oil was converted to resin having a melting point of 98.2° C. and a color of 13. The end temperature of the distillation for removal of oil from the resin was 185° C. and the end pressure was 20 mm. Hg. 267.7 grams of oil were recovered. The calculated per cent yield of 120° C. melting point resin was 32.3%.

In the following example dead oil obtained as in Example 5 was subjected to steam distillation after separation from the light oil, but before polymerization, to remove heat polymers formed during the separation of light oil. The polymerization procedure of Example 1 was employed.

*Example 6*

499.4 grams of dead oil were treated with 4 cc. of 66° Bé. H₂SO₄. Toluene was added after polymerization. Approximately 33% of the dead oil was converted to resin having a melting point of 105.8° C. and a color of 9. The end temperature of the distillation for the removal of oil from the resin was 185° C. and the end pressure was 20 mm. Hg. 293.4 grams of oil were recovered. The calculated per cent yield of 120° C. melting point resin was 30.1%.

The dead oil employed in the following example was extracted from petroleum tar emulsion along with light oil following the procedure described in copending application Serial Number 353,034. After separation of the light oil the polymerization procedure of Example 1 was followed.

Example 7

532.6 grams of dead oil were treated with 8 cc. of 66° Bé. $H_2SO_4$. Toluene was added after polymerization. Approximately 42% of the dead oil was converted to resin having a melting point of 97° C. and a color of 17. The end temperature of the distillation for the removal of oil from the resin was 192° C. and the end pressure was 18 mm. Hg. 145.9 grams of oil were recovered. The calculated per cent yield of 120° C. melting point resin was 36.2%.

In the following example the dead oil of Example 7 was steam distilled just prior to polymerization to remove heat polymer formed during its separation from light oil. The polymerization procedure of Example 1 was followed.

Example 8

504 grams of dead oil were treated with 6 cc. of 66° Bé. $H_2SO_4$. Naphtha was added after polymerization. Approximately 27% of the dead oil was converted to resin having a melting point of 119.4° C. and a color of 14. The end temperature of the distillation for the removal of oil from the resin was 225° C. and the end pressure was 20 mm. Hg. 303.5 grams of oil were recovered. The calculated per cent yield of 120° C. melting point resin was also approximately 27%.

The dead oil of the following example was obtained from petroleum tar emulsion by the process of copending application Serial Number 342,735. After separation from light oil it was treated to remove heat polymerizable unsaturates by heating at 200° C. for 4 hours followed by removal of the heat polymer resin formed. It was then subjected to catalytic polymerization following the procedure of Example 1.

Example 9

500 grams of dead oil were treated with 6 cc. of 66° Bé. $H_2SO_4$. Naphtha was added after polymerization. Approximately 19% of the dead oil was converted to resin having a melting point of 88.2° C. and a color of 8. The end temperature of the distillation for the removal of oil from the resin was 185° C. and the end pressure was 20 mm. Hg. 407.9 grams of oil were recovered. The calculated per cent yield of 120° C. melting point resin was approximately 15%.

In the following table are given the results of a series of polymerizations in which metallic halide type catalysts were employed following the general procedure of Examples 3 and 4. The dead oil was of the type obtained by flash distillation following the procedure of copending application Serial Number 342,735.

Table 1

| Catalyst | Starting dead oil in g. | Yield of resin in g. | M. P. of resin, °C. | Percent yield based on orig. dead oil | Percent yield corr. to 120° C. M. P. | Color of resin | Remarks |
|---|---|---|---|---|---|---|---|
| $AlCl_3$ | 302.1 | 96.5 | 108.6 | 31.9 | 29.7 | 17 | Solvent present. |
| Do | 501.2 | 183.8 | 144.7 | 36.6 | 42.2 | 17 | No solvent. |
| Do | 300.0 | 109.1 | 106.4 | 36.4 | 33.3 | 15 | Steam distilled oil. |
| Do | 499.2 | 193.9 | 120.1 | 38.9 | 38.9 | 15 | No solvent. |
| $BF_3Et_2O$ | 301.7 | 85.4 | 151.0 | 28.6 | 33.9 | 14 | Solvent present. |
| Do | 497.4 | 173.9 | 146.0 | 35.0 | 40.5 | 13 | No solvent. |
| Do | 499.4 | 159.2 | 113.9 | 31.9 | 30.8 | 8 | Steam distilled oil. |
| $AlCl_3Et_2O$ | 500.5 | 185.2 | 129.0 | 37.0 | 39.0 | 14 | No solvent. |

From the foregoing it will be seen that mixed catalytic polymers of monomeric hydrocarbons readily polymerizable by heat and of monomeric hydrocarbons not readily polymerizable by heat are produced except when heat polymerizable resins are removed prior to the catalytic polymerization of the remaining monomeric material.

I have found that generally speaking, the unsaturation in dead oil of the general type treated herein is unevenly distributed in that it tends to concentrate in the lower and upper boiling ranges of the dead oil with a relatively lower concentration of unsaturates in the middle boiling range.

A typical distribution of unsaturation and other characteristics is shown in the following table in which are set forth the properties of cuts produced by the distillation of dead oil derived from petroleum tar emulsion by the method described in copending application Serial Number 342,735.

Table 2

| Cut No. | Approximate range of taking cut °C. @ mm. to °C. @ mm. | Percent of total unsaturation in cut | Density @ 30° C. | $Br_2$ m. eq. cc. | 50% pt. of cut, °C. atm. pressure |
|---|---|---|---|---|---|
| 1 | 150 @ 75 | 14.3 | 0.9672 | 5.68 | 218 |
| 2 | 150 @ 75-160 @ 75. | 13.9 | 0.9789 | 4.54 | 227 |
| 3 | 160 @ 75-170 @ 75. | 14.1 | 0.9872 | 3.74 | 238 |
| 4 | 170 @ 75-127 @ 8. | 13.6 | 0.9931 | 3.10 | 249 |
| 5 | 127 @ 8-140 @ 8. | 13.6 | 1.0019 | 3.21 | 262 |
| 6 | 140 @ 8-164 @ 8. | 13.2 | 1.0193 | 4.16 | 285 |
| 7 | 164 @ 8-200 @ 8. | 9.7 | 1.0577 | 4.45 | 327 |
| Residue | | 7.5 | | | |

Each of the cuts of Table 2 was divided into two portions. One portion was heat polymerized for four hours at 200° C. according to the method described in copending application Serial Number 370,608, while the other portion was catalytically polymerized with approximately 1% by volume of 96% $H_2SO_4$ followed by neutralization and washing according to the procedure of Example 1.

After polymerization each resin was hardened by vacuum distillation of oil from the resin.

The following table shows the yields and colors of the resin produced from the various cuts by the two methods of polymerization,

Table 3

| Cut No. | Heat polymerization | | | Catalytic (H₂SO₄) polymerization | | |
|---|---|---|---|---|---|---|
| | Percent resin corrected to 120° C. | Percent resin based on orig. oil | Color | Percent resin corrected to 120° C. | Percent resin based on orig. oil | Color |
| 1 | 19.4 | 2.77 | 13 | 36.2 | 5.18 | 6 |
| 2 | 10.3 | 1.43 | 6 | 26.9 | 3.74 | 9 |
| 3 | 10.4 | 1.47 | 9 | 27.3 | 3.85 | 9 |
| 4 | 11.6 | 1.58 | 10 | 23.6 | 3.21 | 14 |
| 5 | 19.6 | 2.66 | 14 | 28.0 | 3.81 | 14 |
| 6 | 21.1 | 2.79 | 8 | 36.4 | 4.81 | 15 |
| 7 | 21.4 | 2.08 | 14 | 10.2 | .99 | 14 |
| Residue | | 7.5 | Dark | | 7.5 | |
| Total | | 22.28 | | | 33.09 | |

After extraction of the resin the recovered oils were examined as to density and unsaturation with the following results.

Table 4

| Cut No. | Oil recovered from heat polymer | | Oil recovered from acid polymer | |
|---|---|---|---|---|
| | Density @30° C. | Br₂ m. eq. cc. | Density @ 30° C. | Br₂ m. eq. cc. |
| 1 | 0.9748 | 3.67 | 0.9368 | 0.21 |
| 2 | 0.9801 | 3.40 | 0.9414 | 0.16 |
| 3 | 0.9683 | 2.49 | 0.9482 | 0.12 |
| 4 | 0.9898 | 1.89 | 0.9649 | 0.14 |
| 5 | 0.9956 | 1.54 | 0.9701 | 0.18 |
| 6 | 1.0075 | 1.76 | 0.9760 | 0.40 |
| 7 | 1.0579 | 2.73 | 1.0155 | 2.67 |

In order to calculate the per cent of the unsaturation in the above cuts it was necessary to assume (1) the molecular weight for each cut; and (2) that each unsaturated molecule contains a definite number of double bonds.

Figure 1:
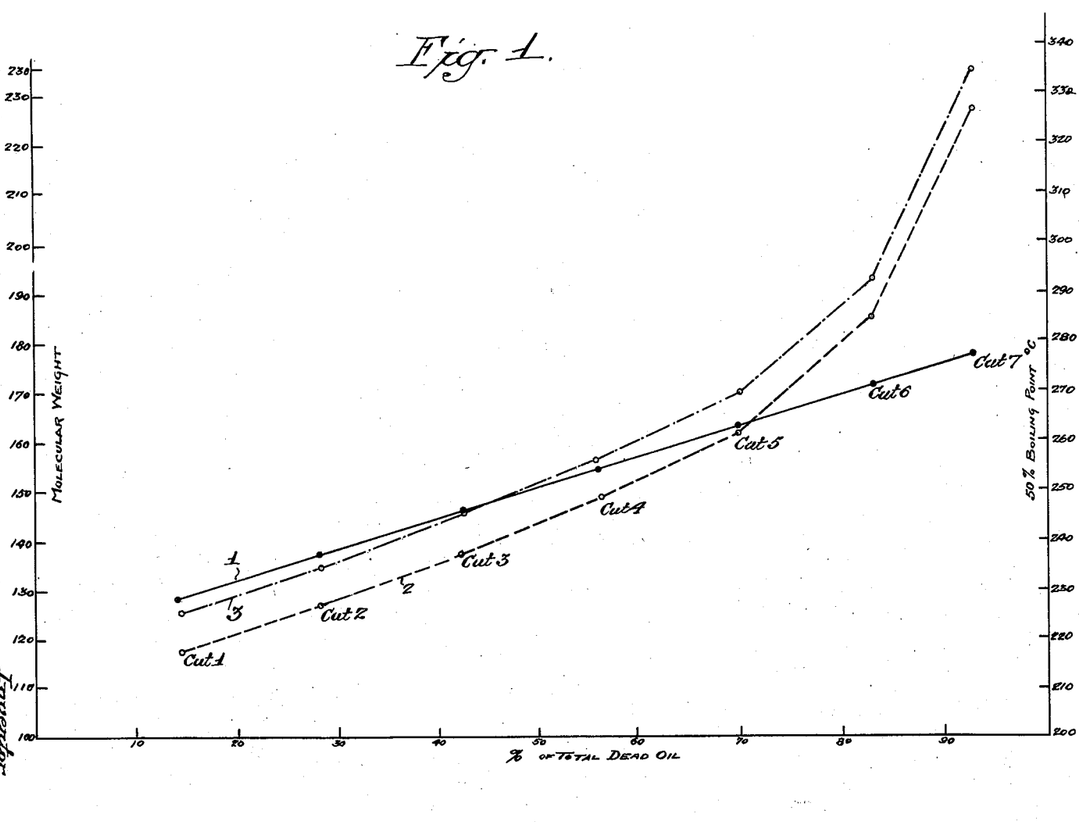
Figure 1 shows curves illustrating unsaturation in cuts of dead oil.

The molecular weights of the above cuts were calculated by two methods and the results are shown in Figure 1 in which molecular weight and 50% boiling points of the cuts are plotted as ordinates against per cent of total dead oil as the abscissa.

In curve 1 it is assumed that cut 1 consists predominately of naphthalene and methyl indene with an average molecular weight of 129, while cut 7 is assumed to consist predominately of compounds having the molecular weight of anthracene, namely 178. Intermediate cuts are assumed to have intermediate molecular weights falling on a straight line.

Curve 2 is a plotting of the 50% boiling points of the various cuts.

Curve 3 is a plotting of the mean molecular weight of each cut on the assumption that the mean molecular weight of a cut is a function of the 50% boiling point of the cut and, hence the curve 3 will be a parallel to curve 2. The exact relation of curve 3 to curve 2 was taken empirically from consideration of the first five cuts.

Table 5 shows the unsaturated content of the original cuts and the unsaturated content of the oil extracted from the respective resins in the case of heat polymerization and in the case of sulfuric acid polymerization. In each case, the column headed 1 is the unsaturation calculated in accordance with the assumptions underlying curve 1 of Figure 1 and the column headed 3 is the unsaturation as calculated from the assumptions underlying curve 3 of Figure 1. In both cases it is assumed that there is but one double bond per molecule.

Table 5

| Cut No. | Original oil | | Solvent oil from heat polymer | | Solvent oil from acid polymer | |
|---|---|---|---|---|---|---|
| | 1 | 3 | 1 | 3 | 1 | 3 |
| 1 | 37.9 | 36.9 | 24.3 | 23.7 | 1.45 | 1.41 |
| 2 | 31.7 | 31.3 | 23.8 | 23.4 | 1.17 | 1.06 |
| 3 | 26.9 | 26.7 | 17.9 | 17.8 | .90 | .88 |
| 4 | 24.2 | 24.5 | 14.8 | 14.5 | 1.12 | 1.14 |
| 5 | 26.2 | 27.2 | 12.7 | 13.2 | 1.52 | 1.58 |
| 6 | 35.0 | 39.5 | 15.0 | 16.9 | 3.52 | 3.96 |
| 7 | 37.4 | 49.4 | 23.0 | 30.3 | 23.4 | 30.9 |

It will be seen that only in cut 7 do the different methods of arriving at molecular weight introduce significant differences in the calculated unsaturations.

Figure 2:
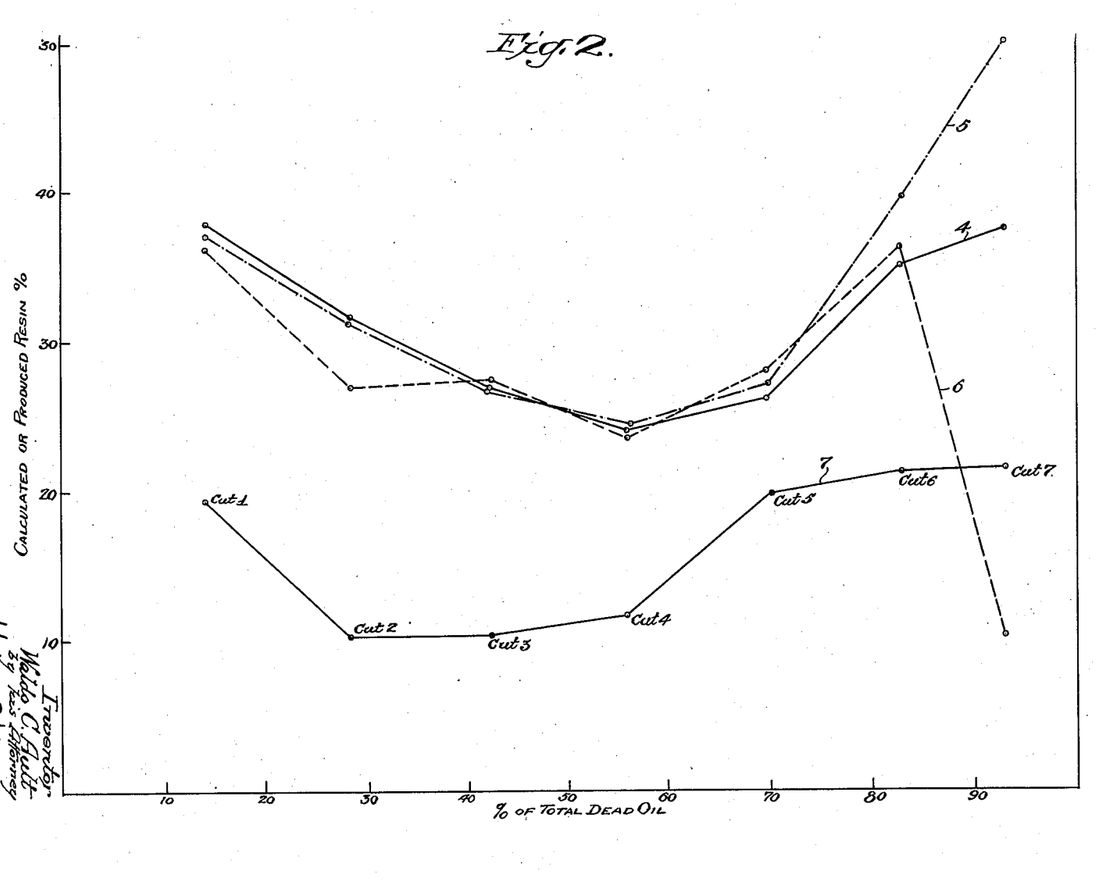
Figure 2 shows curves illustrating a relation between total unsaturation and polymer yield from various dead oil cuts.

Referring to Figure 2, in this figure are shown curves in which per cent of resin produced or calculated in the case of each cut is plotted as the ordinate against per cent of total dead oil as the abscissa.

Curve 4 shows the possible yield of resin assuming that the total unsaturation as indicated in curve 1 of Figure 1 is polymerized. Curve 5 shows the possible yield of resin assuming that the total unsaturation as calculated in accordance with curve 3 is polymerized.

Curve 6 shows the yield of resin actually obtained by sulfuric acid polymerization of the various blended cuts.

Curve 7 shows the actual resin yield produced by heat polymerization of the various blended cuts.

From the curves and the other data on the polymerization of dead oil cuts the following may be noted.

The first cuts and the last cuts contain the most unsaturation with lower unsaturations in the middle cuts.

The acid polymer yields more nearly approach the calculated resin content than do the heat polymer yields.

Heat polymerizes a smaller proportion of the total unsaturates in the lower boiling cuts than in the higher boiling cuts.

The minimum resin yield for heat polymers falls in a lower cut than the minimum resin yield for acid polymers and also falls in a lower cut than the minimum unsaturation content as determined by Br₂ numbers.

In the lower boiling fractions the density of the oils recovered from heat polymers is higher than the density of the original oils, while in all other cases the density of the recovered oils is either approximately the same or is appreciably lower than that of the original oils.

From the viewpoint of the color of the resulting resins, it may be preferable to acid polymerize the lower boiling fractions of the dead oil and heat polymerize the higher boiling fractions.

On heat polymerization of a sample of the original oil prior to fractionation into cuts, a yield of 23.2% of heat polymer was secured which compares very closely with the total of 22.28% for the total of the heat polymers from the cuts.

On sulfuric acid polymerization of the original oil prior to fractionation, a yield of 37.1% acid polymer resin was secured. This is somewhat higher than the total of 33.09% from the various cuts. It will be noted that the acid resin yield from cut 7 is very low. It is thought that this might have been due to cracking during the fractionation of the oil into cuts. The cracking may have produced inactive unsaturation.

In another test made on a similar basis but with somewhat different fractionation procedure the acid polymer from the high boiling cut did not fall off in the manner shown in curve 6 of Figure 2.

As an example of the division of the dead oil into two portions and the acid polymerization of the lower boiling portion and the heat polymerization of the higher boiling portion, the following may be given.

*Example 10*

Two 1000 grams samples of dead oil produced as described in copending application Serial Number 342,735 were distilled in vacuo until 57.8% came overhead leaving a residue of 42.2%.

The separate distillation of a 100 cc. sample of the distillate and of a 100 cc. sample of the residue showed the following.

*Table 6*

|  | Distillate, °C. | Residue, °C. |
|---|---|---|
| I. P. | 213° C | 257° C. |
| 5 cc | 223° C | 260.5° C. |
| 10 cc | 224.5° C | 270.0° C. |
| 50 cc | 234.5° C | 301.0° C. |
| 90 cc | 261° C |  |
| 95 cc | 282° C |  |
| Decomposition | 293.5° C | 323° C. |
| Distillate | 97 cc | 77 cc. |
| Specific gravity at 20° C | 0.9948 | 1.0728. |
| Viscosity at 100° F | 32.3 S. S. U | 276.0 S. S. U. |

The overhead material yielded 26.2% of resin having a color of 9 when polymerized by sulfuric acid in accordance with the before described method.

The residue yielded 41.7% resin having a color of 16 when polymerized by thermal polymerization at 200° C. for four hours.

These yields correspond to an overall yield of 32.7% as compared with approximate yields of 24% by thermal polymerization of the entire dead oil and about 35% by acid polymerization of the entire dead oil.

I have found that the acid polymers are much more soluble than heat polymers from the same dead oil in all solvents except the alcohols.

I further found that polymers from dead oils obtained from the rapid distillation process of copending application Serial Number 342,735 tend to be more soluble in those solvents tried than similarly produced polymers from dead oils produced in the solvent extraction process of copending application Serial Number 353,034.

The greatest increase in solubility of the acid polymers as compared with the heat polymers is noted with such solvents as acetone and diethyl ether but substantial increases in solubility are also to be noted with petroleum solvents.

The following table shows typical solubilities of various sulfuric acid polymers as compared with heat polymers.

The solubilities are expressed in grams dissolved per 100 grams of solvent.

*Table 7*

|  | Ethyl alcohol | Di-ethyl ether | Iso-amyl alcohol | Ethyl acetate | Acetone | CCl₄ | Turpentine | Toluene | Sunoco Hi-flash naphtha | Stoddard solvent (Atreco) |
|---|---|---|---|---|---|---|---|---|---|---|
| HEAT POLYMERS OF DEAD OILS FROM FLASH DISTILLATION OF TAR | | | | | | | | | | |
| Resin melting point 195° C | 0.17 | 1.22 | 0.22 | 3.13 | 1.61 | 25.84 | 10.45 | 39.38 | 2.55 | 2.21 |
| Resin melting point 112° C | 0.26 | 1.28 | 1.10 | 84.71 | 2.40 | 48.32 | 45.46 | 102.97 | 32.72 | 8.40 |
| Resin melting point 91° C | 0.55 | 5.37 | 0.80 | 125.25 | 4.12 | 60.99 | 34.46 | 170.06 | 29.76 | 6.71 |
| HEAT POLYMERS OF DEAD OIL FROM PROPANE EXTRACTION OF TAR | | | | | | | | | | |
| Resin melting point 184° C | 0.13 | 0.27 | 0.57 | 2.62 | 1.48 | 49.15 | 13.16 | 58.74 | 5.43 | 3.57 |
| Resin melting point 115° C | 0.60 | 2.79 | 0.66 | 2.10 | 1.07 | 53.66 | 34.26 | 82.97 | 5.21 | 7.58 |
| Resin melting point 88° C | 0.69 | 1.83 | 0.73 | 6.32 | 3.20 | 72.49 | 29.86 | 144.40 | 3.58 | 2.60 |
| H₂SO₄ POLYMER OF DEAD OIL FROM FLASH DISTILLATION OF TAR | | | | | | | | | | |
| Resin melting point 90° C | 0.73 | 193.05 | 3.89 | 180.34 | 117.13 | 105.65 | 49.52 | 154.61 | 44.91 | 49.35 |
| Resin melting point 109° C | 0.94 | 139.60 | 4.90 | 123.56 | 138.84 | 42.33 | 52.48 | 153.36 | 100.57 | 81.56 |
| H₂SO₄ POLYMER OF DEAD OIL FROM PROPANE EXTRACTION OF TAR | | | | | | | | | | |
| Resin melting point 107° C | 1.44 | 12.89 | 3.16 | 112.62 | 12.36 | 65.58 | 46.28 | 105.09 | 16.46 | 9.34 |
| H₂SO₄ POLYMER OF STEAM DISTILLATE FROM DEAD OIL FROM FLASH DISTILLATION OF TAR | | | | | | | | | | |
| Resin melting point 106° C | 0.73 | 152.72 | 3.85 | 93.24 | 111.47 | 58.56 | 89.39 | 142.15 | 52.22 | 47.51 |
| H₂SO₄ POLYMER OF STEAM DISTILLATE FROM DEAD OIL FROM PROPANE EXTRACTION OF TAR | | | | | | | | | | |
| Resin melting point 119° C | 0.83 | 152.03 | 5.01 | 110.19 | 111.47 | 71.71 | 52.01 | 153.15 | 37.76 | 83.43 |

Table 8 also shows typical relative solubilities of sulfuric acid resins from dead oils from flash distilled and propane extracted tars as compared with heat polymers from dead oil from flash distilled and propane extracted tars.

but a slight diazo reaction indicating the substantial absence of phenols.

The resins of this invention usually will give negative Lieberman Storch reactions indicating absence of rosin acids.

Table 8

| Source of dead oil | Type of polymerization | Percent insoluble in petroleum ether-pentane (asphaltenes) | Percent insoluble in petroleum ether-pentane but soluble in CCl₄ (hard resins) | Percent insoluble in both petroleum ether-pentane and CCl4 (carbenes and carboids) | Percent soluble in pentane-petroleum ether | Percent soluble in pentane-petroleum-ether. Not extracted from clay (soft resins) | Percent soluble in pentane-petroleum ether. Extracted from clay (oily constituents) | Calculated oily constituents (calculated from M. P. of resins) | Total soft and hard resins |
|---|---|---|---|---|---|---|---|---|---|
| Dead oil from flash distilled tar. | Heat | 40.5 | 40.5 | 0.02 | 59.4 | 26.5 | 32.9 | 51.0 | 66.5 |
| Dead oil from propane extracted tar. | ...do | 46.4 | 19.1 | 27.3 | 53.5 | 14.2 | 39.3 | 43.2 | 33.3 |
| Dead oil from flash distilled tar. | Sulfuric acid. | 10.6 | 10.5 | 0.03 | 89.3 | 44.3 | 45.1 | 49.8 | 54.8 |
| Dead oil from propane extracted tar. | ...do | 53.4 | 53.2 | 0.1 | 46.6 | 8.9 | 37.7 | 46.8 | 62.1 |

The method generally followed in tests for solubility shown in Table 8 is that described in "Asphalts and Allied Substances"—Herbert Abraham, 4th edition published by O. Van Nostrand Co.—Chapter 32, Subsections 38a to 38c inclusive, particularly page 1008. CCl₄ was employed instead of CHCl₃.

No great difference has been observed in the molecular weight of the resins of equal melting point produced hereunder regardless of the method of polymerization. Naturally, the molecular weight of the resin varies widely with the degree of extraction of associated oil as does the melting point. Highly extracted resins have high melting points and high molecular weights, while resins less exhaustively extracted have lower melting points and lower molecular weights.

Molecular weights from a large number of catalytic resins hereunder were found to vary from 354 for resin melting at 94° C. (cube in Hg) to 629 for a resin having a melting point of 151° C. (cube in Hg).

The molecular weights were determined by the benzene freezing point depression method.

The densities of the acid polymers tend to be somewhat lower than the heat polymers from the same dead oil. Thus sulfuric acid polymers from dead oils from the flash distillation of petroleum tar have been noted to vary from 1.12 to 1.13, while heat polymers from dead oil of this type have been noted to vary from 1.14 to 1.16.

The sulfuric acid polymers from dead oils from the solvent extraction of petroleum oil tar have been noted to be somewhat higher in density for example, of the order of 1.18 and higher.

Heat resins from the dead oil from the same type of solvent extracted tar have been found to vary from 1.15 to 1.20.

AlCl₃ polymers examined have had densities varying from 1.12 to 1.14.

BF₃Et₂O polymers have been noted to have densities of the order of 1.25 to 1.31.

From the densities and other characteristics of the resins and of the associated oils, these materials are evidently of a highly aromatic nature.

The resins of this invention, except those hardened by exhaustive steam distillation to a very high melting point, will usually react positively in the anthraquinone reaction indicating the presence of anthracene, unless produced from lower boiling portions of the dead oil, which do not contain anthracene, or unless the anthracene were otherwise removed.

The resins of this invention will usually give

On thermal decomposition of the resins of this invention, appreciable yields of material boiling within the range from 210° C. to 350° C., will be produced.

The catalytic polymer resins of this invention are usually substantially completely soluble in CS₂ and 2° Benzol.

The processes described in the above copending applications are examples of methods for deriving "dead oil" unsaturated hydrocarbon material which may then be polymerized by methods such as are described herein. Other procedures for deriving "dead oil" unsaturated material, however, might be employed. The important factor in this respect is the separation of the "dead oil" from the residual tar without prolonged heating in contact with the pitchy materials of the residual tar. Stated in other words, the greater the extent to which polymerization of these dead oil materials into the residual tar is avoided, the higher will be the yield of high boiling heat polymerizable and also catalytically polymerizable monomeric material.

After separation of the "dead oil" from the residual tar avoidance of polymerization is not so important if it is desired to convert this heat polymerizable monomeric material into heat polymers as any such polymers may be separated from the "dead oil" by distillation.

However, if the highest yields of catalytic polymer are desired avoidance of excessive heat polymerization after separation from the residual tar is also desirable.

The particular yields of catalytic polymers will depend, other conditions being equal, upon the character of the petroleum oil pyrolyzed and the conditions of pyrolysis. Higher yields are usually possible in connection with the pyrolysis of the more naphthenic oils for instance, oils of classes 5 to 7 as determined by the method of classification of Bureau of Mines Bulletin #291 as modified by Bureau of Mines Report of Investigations 3279, with oils of class 7 the more preferred. Temperatures of pyrolysis above 1450° F. may be preferred also from a standpoint of yields of resin.

In the separation of lower boiling hydrocarbon material from the pitch constituents of residual tar by various methods, the oil separated may contain components boiling above 350° C. and/or below 210° C. and it is not intended generally to preclude the presence of catalytically polymerizable monomeric material boiling outside the range of from 210° and 350° C. with the monomeric material boiling within that range nor is it intended generally to preclude the presence of catalytic polymers derived from monomers boiling outside said range along with polymers derived from monomers boiling within said range.

Examples of procedure and characteristics above described are given for purposes of illustration. It is not intended that the invention shall be necessarily limited thereby.

The catalytic resins produced hereunder are of value in the production of paints, enamels, lacquers, roofing compounds, friction materials, such as brake blocks and brake linings, coating for coal to prevent dusting, printing ink, paper, caulking compounds, etc.

The associated oils recovered in the extraction of the resins are highly aromatic and valuable as high boiling solvents.

The addition of other materials to the catalytically polymerizable monomeric unsaturated materials prior to polymerization or to the resins after polymerization may, of course, modify the properties of the resin produced.

Examples of such materials are other synthetic or natural resins, plasticizers, softeners, fillers, coloring materials, etc.

While I have referred to a certain type of unsaturated monomeric hydrocarbon material as being polymerizable by heat and by catalysts, it is to be understood that either or both may be applied.

These and other modifications may be made without departing from the spirit of this invention.

I claim:

1. A process for producing a hydrocarbon resin from a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 15% of the total unsaturation present in said hydrocarbon oil boiling between 210° C. and 350° C. as determined by bromine titration, comprising polymerizing in admixture both types of said polymerizable hydrocarbons contained in said hydrocarbon oil to form catalytic resin polymer by treating said hydrocarbon oil with a resin-producing catalyst.

2. A process for producing a hydrocarbon resin from a hydrocarbon oil which has been physically separated from tar produced in the vapor phase pyrolysis of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a mineral acid catalyst, other hydrocarbons boiling between 210° C. and 350° C. which are polymerizable to catalytic resin polymer by treating said oil with a mineral acid catalyst but which last-mentioned hydrocarbons are also polymerizable to heat resin polymer by the application to said oil of heat alone, said last-mentioned hydrocarbons being present in said hydrocarbon oil in amount greater than approximately 25% of the total unsaturation present in said hydrocarbon oil boiling between 210° C. and 350° C. as determined by bromide titration, comprising polymerizing in admixture both types of said polymerizable hydrocarbons contained in said hydrocarbon oil to form catalytic resin polymer by treating said hydrocarbon oil with a mineral acid catalyst.

3. A process for producing a hydrocarbon resin from a hydrocarbon oil which has been physically separated from tar-water emulsion produced in the vapor phase pyrolysis in the presence of steam of petroleum oil and which is free from and of greater volatility than the pitch of said tar, said hydrocarbon oil containing in addition to aromatic hydrocarbons boiling between 210° C. and 350° C. which are not polymerizable by the application to said oil of heat alone but which are polymerizable to catalytic resin polymer by treating said oil with sulfuric acid, other aromatic hydrocarbons boiling between 210° C. and 350° C. which are polymerizable to catalytic resin polymer by treating said oil with sulfuric acid but which last-mentioned hydrocarbons are also polymerizable to heat resin polymer by the application to said oil of heat alone, said last-mentioned hydrocarbons being present in said hydrocarbon oil in amount greater than approximately 25% of the total unsaturation present in said hydrocarbon oil boiling between 210° C. and 350° C. as determined by bromine titration, comprising polymerizing in admixture both types of said polymerizable hydrocarbons contained in said hydrocarbon oil to form catalytic resin polymer by treating said hydrocarbon oil with sulfuric acid.

4. A process for producing a hydrocarbon resin from a hydrocarbon oil which has been physically separated from tar-water emulsion produced in the vapor phase pyrolysis in the presence of steam of petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with an acid-acting metallic halide catalyst, other hydrocarbons boiling between 210° C. and 350° C. which are polymerizable to catalytic resin polymer by treating said oil with an acid-acting metallic halide catalyst but which last-mentioned hydrocarbons are also polymerizable to heat resin polymer by the application to said oil of heat alone, said last-mentioned hydrocarbons being present in said hydrocarbon oil in amount greater than approximately 25% of the total unsaturation present in said hydrocarbon oil boiling between 210° C. and 350° C. as determined by bromine titration, comprising polymerizing in admixture both types of said polymerizable hydrocarbons contained in said hydrocarbon oil to form catalytic resin polymer by treating said hydrocarbon oil with an acid-acting metallic halide catalyst.

5. A process for producing a hydrocarbon resin from a hydrocarbon oil which has been physically separated from tar-water emulsion produced in the vapor phase pyrolysis in the presence of steam of petroleum oil and which is free from and of greater volatility than the pitch of said tar, said hydrocarbon oil containing in addition to aromatic hydrocarbons boiling between 210° C. and 350° C. which are not polymerizable by the application to said oil of heat alone but which are polymerizable to catalytic resin polymer by treating said oil with activated clay, other aromatic hydrocarbons boiling between 210° C. and 350° C. which are polymerizable to catalytic resin polymer by treating said oil with activated clay but which last-mentioned hydrocarbons are also polymerizable to heat resin polymer by the application to said oil of heat alone, said last-mentioned hydrocarbons being present in said hydrocarbon oil in amount greater than approximately 25% of the total unsaturation present in said hydrocarbon oil boiling between 210° C. and 350° C. as determined by bromine titration, comprising polymerizing in admixture both types of said polymerizable hydrocarbons contained in said hydrocarbon oil to form catalytic resin polymer by treating said hydrocarbon oil with activated clay.

6. Resin produced by the process of claim 1.
7. Resin produced by the process of claim 11.
8. Resin produced by the process of claim 3.
9. Resin produced by the process of claim 4.
10. Resin produced by the process of claim 5.
11. A process for producing a hydrocarbon resin from a hydrocarbon oil which has been physically separated from tar-water emulsion produced in the vapor phase pyrolysis in the presence of steam of a naphthenic petroleum oil and which is free from and of greater volatility than the pitch of said tar, said hydrocarbon oil containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 15% of the total unsaturation present in said hydrocarbon oil boiling between 210° C. and 350° C. as determined by bromine titration, comprising polymerizing in admixture both types of said polymerizable hydrocarbons contained in said hydrocarbon oil to form catalytic resin polymer by treating said hydrocarbon oil with a resin-producing catalyst.

WALDO C. AULT.